US011282167B1

(12) United States Patent
Lee

(10) Patent No.: US 11,282,167 B1
(45) Date of Patent: Mar. 22, 2022

(54) ELECTRONIC DEVICE INCLUDING FLEXIBLE DISPLAY AND METHOD OF OPERATION THEREOF

(71) Applicant: Samsung Electronics Co., Ltd., Suwon-si (KR)

(72) Inventor: Changhan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/321,755

(22) Filed: May 17, 2021

(30) Foreign Application Priority Data

Nov. 6, 2020  (KR) .................. 10-2020-0148046
Dec. 2, 2020  (KR) .................. 10-2020-0166848

(51) Int. Cl.
*G06T 3/40* (2006.01)
*G06F 1/16* (2006.01)

(52) U.S. Cl.
CPC .............. *G06T 3/40* (2013.01); *G06F 1/1652* (2013.01)

(58) Field of Classification Search
None
See application file for complete search history.

(56) References Cited

FOREIGN PATENT DOCUMENTS

| KR | 10-2016-0123620 A | 10/2016 |
| KR | 10-2016-0139297 A | 12/2016 |
| KR | 10-2017-0012628 A | 2/2017 |
| KR | 10-2019-0110318 A | 9/2019 |
| KR | 10-2019-0141518 A | 12/2019 |
| KR | 10-2020-0075809 A | 6/2020 |

OTHER PUBLICATIONS

Korean Notice of Allowance dated Jul. 19, 2021, issued in Korean Application No. 10-2020-0166848.
Korean Notice of Preliminary Examination dated Jan. 19, 2021, issued in Korean Application No. 10-2020-0166848.

*Primary Examiner* — Peter Hoang
(74) *Attorney, Agent, or Firm* — Jefferson IP Law, LLP

(57) ABSTRACT

An electronic device is provided. The electronic device includes a flexible display and a processor operatively connected to the flexible display. The processor may be configured to estimate a size of a display region after a delay time elapses upon detecting that the size of the display region is changed, at a first time, to form a second frame at the estimated size of the display region, to identify the size of the display region at a second time when the second frame is completely formed, to obtain a first difference value that is a difference value between a size of the second frame and the size of the display region at the second time, to obtain a second difference value that is a difference value between a size of a first frame output to the display region at the second time and the size of the display region at the second time, to output the second frame in the display region of the flexible display when the first difference value is less than the second difference value, and to maintain an output of the first frame in the display region when the first difference value is not less than the second difference value.

20 Claims, 12 Drawing Sheets

ELECTRONIC DEVICE INCLUDING FLEXIBLE DISPLAY AND METHOD OF OPERATION THEREOF

CROSS-REFERENCE TO RELATED APPLICATION(S)

This application is based on and claims priority under 35 U.S.C. § 119(a) of a Korean patent application number 10-2020-0148046, filed on Nov. 6, 2020, in the Korean Intellectual Property Office, and of a Korean patent application number 10-2020-0166848, filed on Dec. 2, 2020, in the Korean Intellectual Property Office, the disclosure of each of which is incorporated by reference herein its entirety.

BACKGROUND

1. Field

The disclosure relates to an electronic device including a flexible display having a variable screen display region, and an operating method of thereof.

2. Description of Related Art

Nowadays, various types of electronic devices are being developed to secure an extended display region without being inconvenient for portability. For example, a flexible display electronic device may include a slide-type electronic device, a rollable-type electronic device, or a foldable-type electronic device. The slide-type electronic device may use a scheme in which a display is pulled out while at least one side surface of the housing of an electronic device slides, and then a screen region exposed to the outside of the electronic device is expanded. The rollable-type electronic device may use a scheme in which a screen region exposed to the outside of the electronic device is expanded while a display wound inside or outside the housing is spread. The foldable-type electronic device may use a scheme in which a screen region of a display is expanded as the folded housing is unfolded.

An electronic device having a flexible display may detect a change in a size (e.g., the area of a display region) of a display region, and then may generate an image frame to be displayed on a screen by using the changed size as an input value. The generated image frame may again wait for a screen refresh rate, and then may be displayed on an actual display screen. Accordingly, there may be a delay until an image frame formed depending on an input for changing a size of the display region is actually displayed on the screen.

The above information is presented as background information only to assist with an understanding of the disclosure. No determination has been made, and no assertion is made, as to whether any of the above might be applicable as prior art with regard to the disclosure.

SUMMARY

When there is a delay between the time an electronic device including a flexible display detects a change in a size of a display region and the time an image frame formed depending on an input for changing the size of the display region is actually displayed on a screen, the size of the display region of the flexible display may be changed (expanded or reduced) during the delay time. Accordingly, when the formed image frame is actually displayed on the screen, there may be a difference between a size of an output image frame and a size of a current display region.

Aspects of the disclosure are to address at least the above-mentioned problems and/or disadvantages and to provide at least the advantages described below. Accordingly, an aspect of the disclosure is to provide an electronic device including a flexible display that is capable of reducing a difference between a changed size of a display region and a size of an output image frame, and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display and a processor operatively connected to the flexible display. The processor is configured to estimate a size of a display region after a delay time elapses upon detecting that the size of the display region is changed, at a first time, to form a second frame at the estimated size of the display region, to identify the size of the display region at a second time when the second frame is completely formed, to obtain a first difference value that is a difference between a size of the second frame and the size of the display region at the second time, to obtain a second difference value that is a difference between a size of a first frame output to the display region at the second time and the size of the display region at the second time, to output the second frame in the display region of the flexible display when the first difference value is less than the second difference value, and to maintain an output of the first frame in the display region when the first difference value is not less than the second difference value.

In accordance with another aspect of the disclosure, a display region updating method of an electronic device including a flexible display is provided. The method includes estimating a size of a display region after a delay time elapses upon detecting that the size of the display region is changed, at a first time, forming a second frame at the estimated size of the display region, identifying the size of the display region at a second time when the second frame is completely formed, obtaining a first difference value that is a difference between a size of the second frame and the size of the display region at the second time, obtaining a second difference value that is a difference between a size of a first frame output to the display region at the second time and the size of the display region at the second time, outputting the second frame in the display region of the flexible display when the first difference value is less than the second difference value, and maintaining an output of the first frame in the display region when the first difference value is not less than the second difference value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
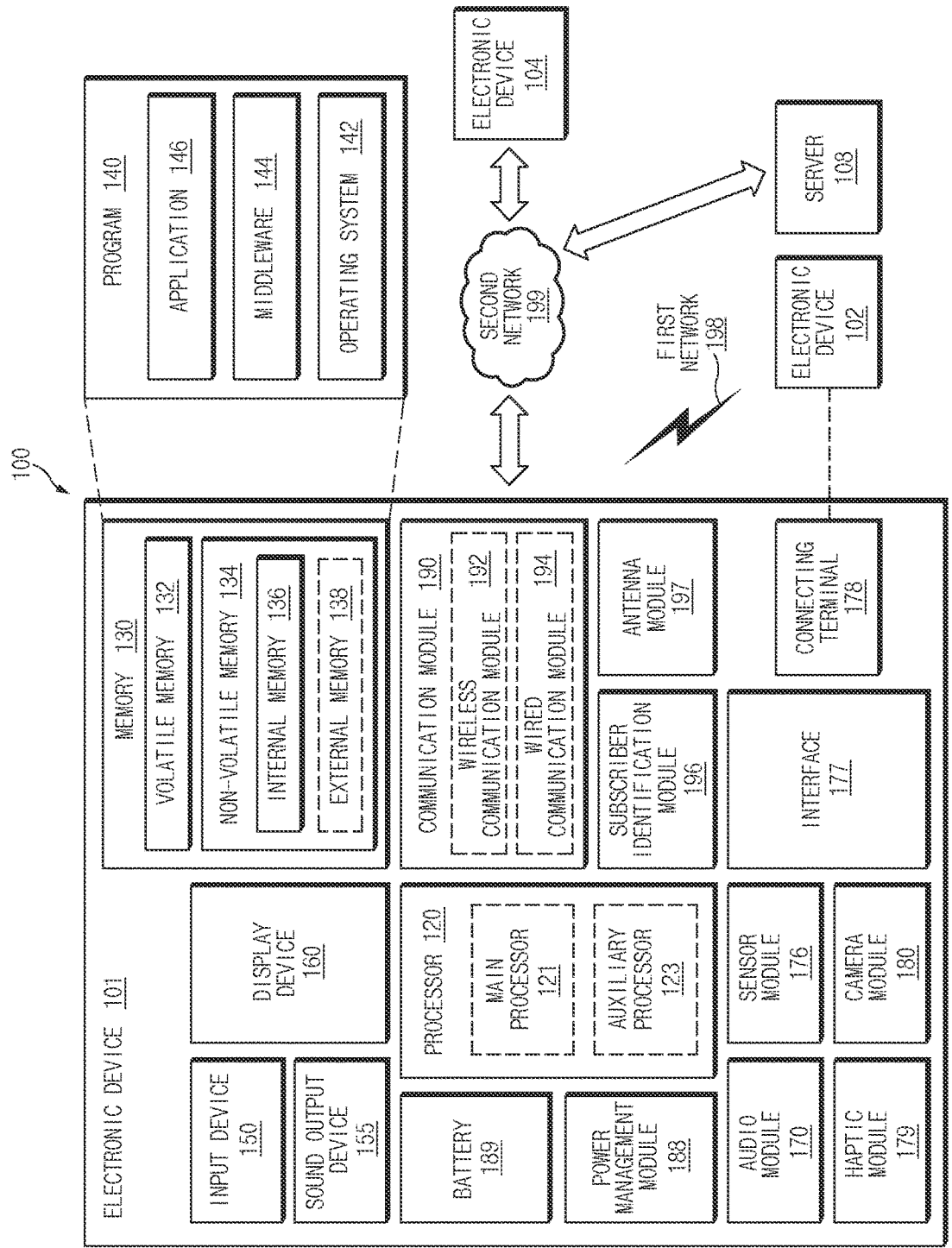
FIG. 1 is a block diagram of an electronic device 101 in a network environment 100, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In an embodiment, some (e.g., a sensor module 176, a camera module 180, or an antenna module 197) of the components may be implemented as single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing unit) may include a hardware structure specialized to process an artificial intelligence model. The artificial intelligence model may be generated through machine learning. For example, the learning may be performed in the electronic device 101, in which an artificial intelligence program is performed, or may be performed through a separate server (e.g., server 108). For example, the learning algorithm may include supervised learning, unsupervised learning, semi-supervised learning, or reinforcement learning, but may not be limited to the above example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described example. In addition to a hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a sensor (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology after a 4G network, for example, a new radio (NR) access technology. The NR access technology may support enhanced mobile broadband (eMBB), massive machine type communications (mMTC), or ultra-reliable and low-latency communications (URLLC). For example, the wireless communication module 192 may support a high frequency band (e.g., mmWave band) to achieve a high data transfer rate. The wireless communication module 192 may support various technologies for securing performance in a high frequency band, for example, technologies such as beamforming, massive multiple-input and multiple-output (massive MIMO), full dimensional MIMO (FD-MIMO), an array antenna, analog beam-forming, and a large scale antenna. The wireless communication module 192 may support various requirements regulated in the electronic device 101, an external electronic device (e.g., the electronic device 104) or a network system (e.g., the second network 199). According to an embodiment, the wireless communication module 192 may support peak data rate (e.g., 20 Gbps or more) for eMBB implementation, loss coverage (e.g., 164 dB or less) for mMTC implementation, or U-plane latency (e.g., downlink (DL) of 0.5 ms or less and uplink (UL) of 0.5 ms or less, or round trip of 1 ms or less) for URLLC implementation.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., an antenna array). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board (PCB), a radio frequency integrated circuit (RFIC), and a plurality of antennas (e.g., an array antenna). The RFIC may be disposed on or adjacent to a first surface (e.g., a bottom surface) of the PCB and may support a specified high frequency band (e.g., mmWave band). The plurality of antennas may be disposed on or adjacent to a second surface (e.g., a top surface or a side surface) of the PCB and may transmit or receive a signal in the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. For example, the electronic device 101 may provide an ultra-low latency service by using distributed computing or mobile edge computing. In another embodiment, the external electronic device 104 may include an Internet of Things (IoT) device. The server 108 may be an intelligent server using machine learning and/or a neural network. According to an embodiment, the external electronic device 104 or the server 108 may be included in the second network 199. The electronic device 101 may be applied to an intelligence service (e.g., a smart home, a smart city, a smart car, or a healthcare) based on 5G communication technology and IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities and some of the plurality entities may be separately disposed in another component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an operation of an electronic device according to an embodiment will be described with reference to FIGS. 2, 3 and 4.

Figure 2:
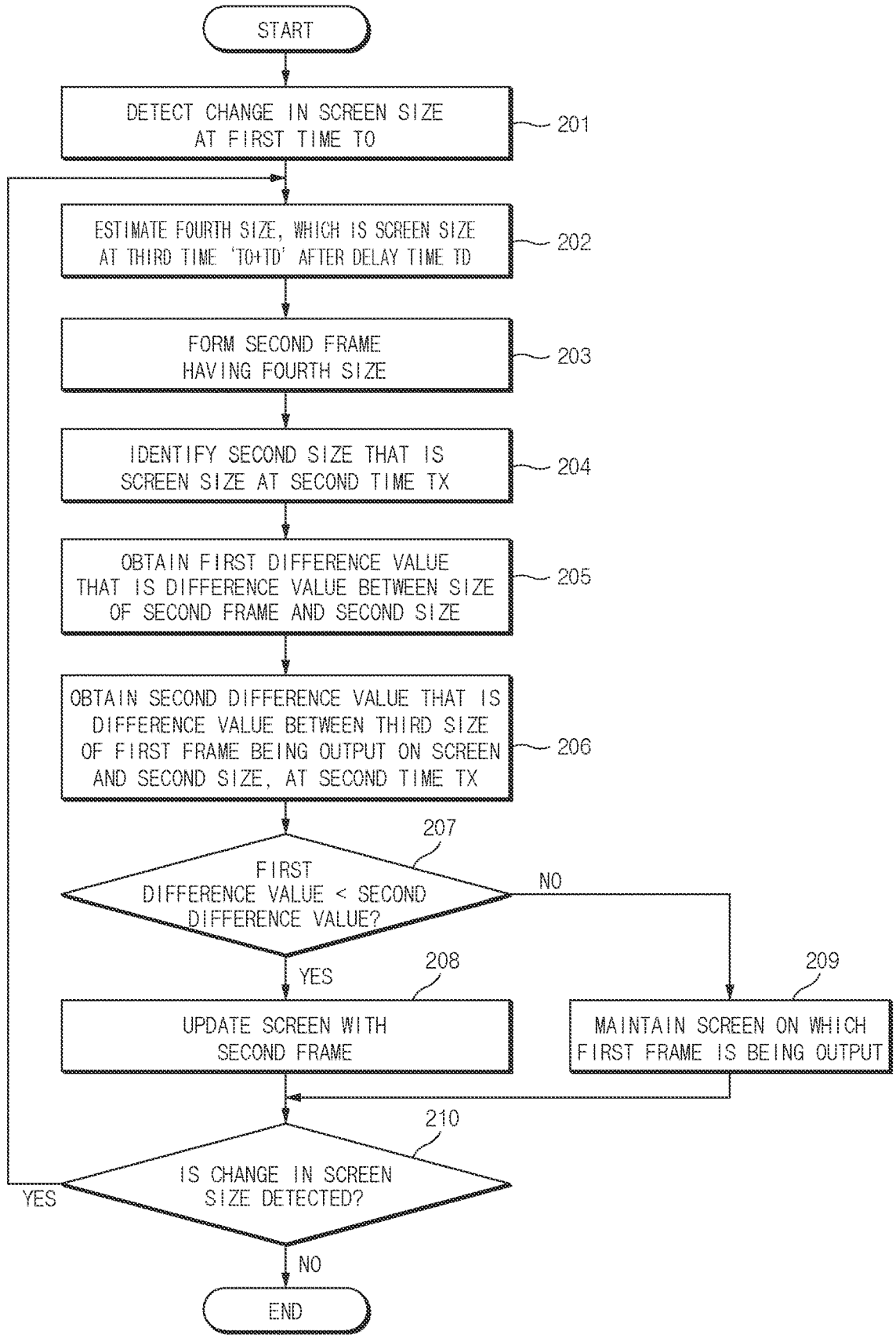
FIG. 2 is a flowchart illustrating an operation of an electronic device, according to an embodiment of the disclosure.

FIG. 2 is a flowchart 200 illustrating an operation of an electronic device, according to an embodiment of the disclosure.

Figure 3:
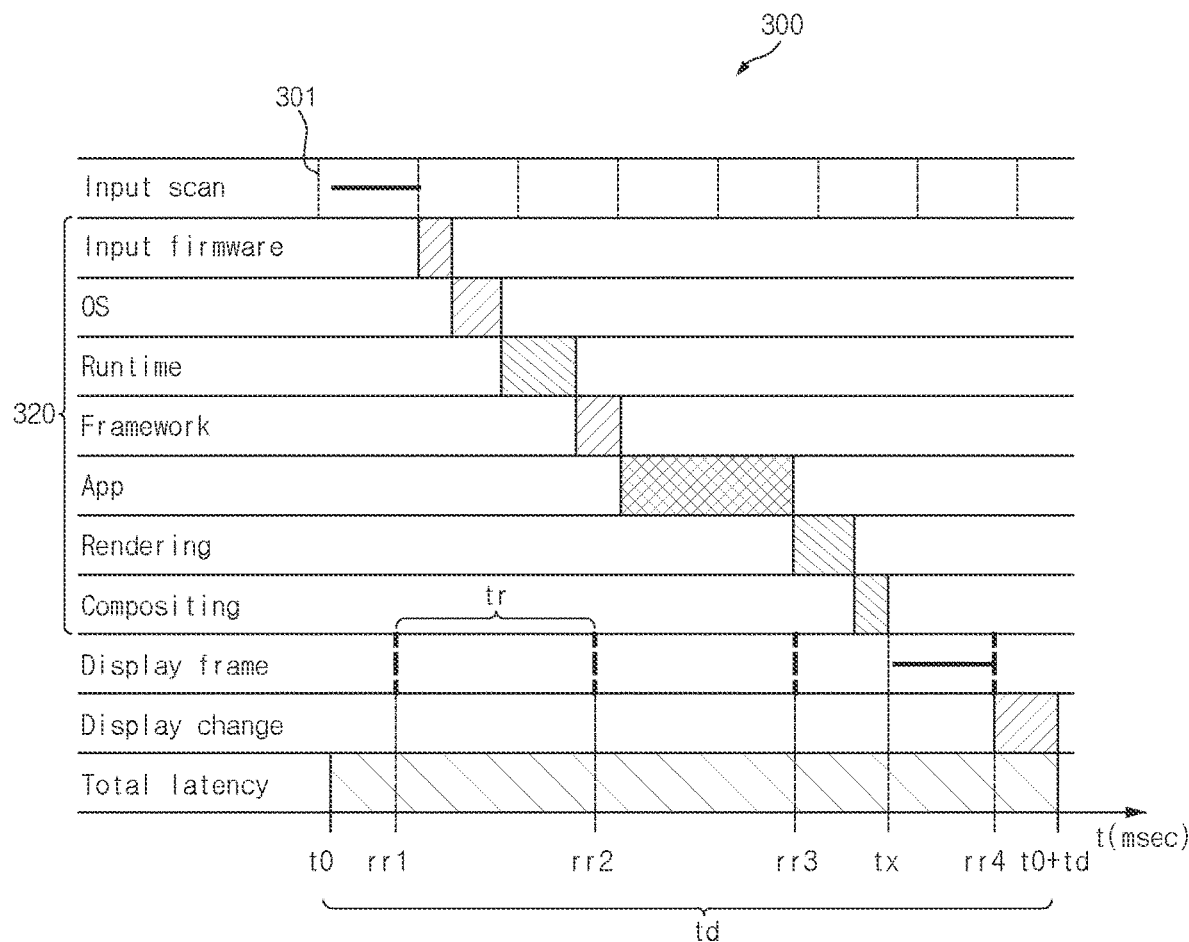
FIG. 3 is a diagram illustrating an operation until a screen of an electronic device is updated, according to an embodiment of the disclosure.

FIG. 3 is a diagram 300 illustrating an operation until a screen of an electronic device is updated, according to an embodiment of the disclosure.

Figure 4:
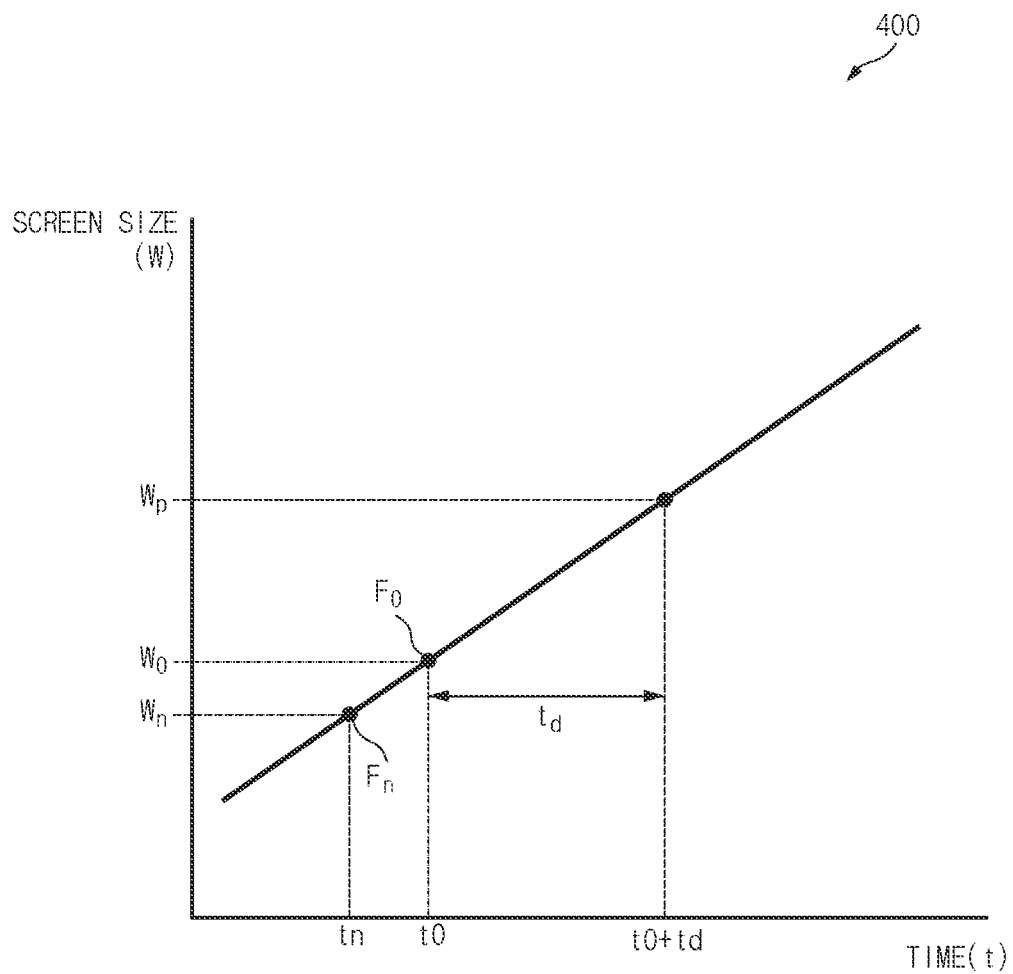
FIG. 4 is a diagram for describing a method of estimating a size of a display region of an electronic device, according to an embodiment of the disclosure.

FIG. 4 is a diagram 400 for describing a method of estimating a size of a display region of an electronic device, according to an embodiment of the disclosure.

In the specification, a display region may refer to a region, in which content is displayed by being exposed to a front surface of an electronic device, from among display regions.

Referring to FIGS. 2-4, a display module of an electronic device (e.g., the electronic device 101 in FIG. 1) may be a flexible display module (e.g., the display module 160 in FIG. 1). A flexible display module may correspond to a slide type, a rollable type, or a foldable type. The slide type may refer to a display that is pulled out while at least one side surface of the housing of an electronic device slides, and then a screen region exposed to the outside of the electronic device is expanded. The rollable type may refer to a display in which a screen region exposed to the outside of the electronic device is expanded while a display wound inside or outside the housing is unrolled. The foldable type may refer to a display in which a screen region of a display is expanded as the folded housing is unfolded.

Referring to FIG. 3, a current time (e.g., a reference time at which an electronic device recognizes a size of a display region and then starts rendering a frame at the uppermost end of software) may be referred to as a first time t0. A time when a frame for the corresponding signal is completely formed through a plurality of operations 320 on a stack of software upon detecting a signal (e.g., a first signal 301) for a change in the size of the display region may be referred to as a second time tx. An elapsed time of a delay time td required until a frame for the corresponding signal is reflected to a screen after a signal (e.g., the first signal 301) for changing the size of the display region is detected at the first time t0 may be referred to as a third time 't0+td'. According to an embodiment of the disclosure, an electronic device has a screen refresh rate tr (e.g., a difference between a first screen update time rr1 and a second screen update time rr2), the size of the display region of the electronic device at the first time t0 is a first size, the size of the display region of the electronic device at the second time tx is a second size, and a size of a first frame displayed in a display region of the electronic device at the second time tx is a third size.

Referring to FIGS. 2 and 3, in operation 201, the electronic device may detect a change in a size of a display region at the first time t0 that is a current time. The electronic device may periodically detect the change in the size of the display region. The electronic device may detect the signal 301 for changing the size of the display region at the first time t0.

In operation 202, the electronic device may estimate a fourth size, which is a predicted size of the display region at the third time 't0+td' after the delay time td. A method, in which an electronic device including a flexible display module obtains a size of a display region after a specific time has elapsed, will be described below with reference to FIG. 4.

Referring to FIG. 4, when the size of the display region at the first time t0 is a first size w0, and the size of the display region at a fourth time to before a specific time from the first time t0 is a fifth size wn, the electronic device may predict a fourth size wp, which is the size of the display region at the third time 't0+td' after the delay time td from the first time t0.

If a speed at which the size of the display region is changed is constant, the electronic device may estimate a slope 'a' between a point f0 and a point fn as "a=(w0−wn)/(t0−tn)". The electronic device may estimate the fourth size wp as "wp=a*td" through the slope 'a'. The estimated fourth size wp may be greater than the maximum size of the display region of the electronic device. In this case, the electronic device may correct the fourth size wp to the largest size of a region capable of being displayed. The estimated fourth size wp may be smaller than the minimum size of the display region of the electronic device. In this case, the electronic device may correct the fourth size wp to the minimum size of the display region of the display.

When the electronic device includes a semi-automatic display that expands a screen using elasticity such as a spring while a change in the size of the display region of the display is started by a user's external force (a pushing force or a pulling force), the accuracy of prediction for the size of the display region of the electronic device after a specific time elapses may be increased because a constant acceleration acts in a section where elasticity acts. Furthermore, when the size of the display region of the display is automatically changed using a motor or the like in an electronic device, the accuracy of prediction for the size of the display region of the electronic device may be increased because the speed of a size change of the display region is uniform.

Returning back to FIGS. 2 and 3, in operation 203, the electronic device may form a second frame having the fourth size obtained in operation 202. Operation 202 and operation 203 may be included in the plurality of operations 320 of FIG. 3. A time at which the second frame is completely formed may be the second time tx. The plurality of operations 320 on a software stack may be changed depending on a policy of an operating system or framework. The operating system may periodically fetch a size value of the display region entered by input firmware from a memory and may add input/output interrupt events. A runtime may refer to a time required to deliver an event registered by the operating system to the framework. The framework may process the event and may deliver the processed event to an appropriate application. The application may receive a display region size value of the event, may perform computations such as memory allocation, layout adjustment, and the like, and may generate an image through a rendering process. Images, which are displayed on a screen and which are generated by the framework such as an application, a system interface (UI), and the like, may be composed into one image in a compositing process. The composed image may be displayed on the screen at a display refresh rate.

In operation 204, the electronic device may measure the size of the display region at the second time tx that is a current time. The size of the screen measured in the second time tx may be the second size. The size of the display region of the electronic device from the first time t0 to the second time tx may be changed manually, semi-automatically, or automatically.

In operation 205, the electronic device may obtain a first difference value between the fourth size of the second frame formed in operation 203 and the second size of the display region measured in operation 204.

In operation 206, the electronic device may obtain a second difference value between the third size of the first frame being displayed on the screen and the second size of the display region measured in operation 204. The first frame may be displayed on the screen after being updated at a screen update time rr3 before the second time tx. Alternatively, the first frame may be displayed on the screen after being updated before the screen update time rr3.

In operation 207, the electronic device may determine whether the first difference value is less than the second difference value. The electronic device may compare the first difference value and the second difference value, and thus may determine a frame, of which the size is similar to the size of a current display region, from among the first frame currently being displayed and the second frame formed by estimating a size of the display region at the third time 't0+td'

When the first difference value is less than the second difference value, then in operation 208, the electronic device may update a screen with the second frame formed in operation 203 at a screen update time rr4 after the second time tx.

When the first difference value is not less than the second difference value, then in operation 209, at the next screen update time rr4 the electronic device may maintain a current screen, on which the first frame is being displayed, without updating to the second frame.

In operation 210, the electronic device may determine whether a change in the size of the display region is continuously detected within a specific time. The specific time may be a period in which a signal for changing the size of the display region is detected. When the change in the size of the display region is continuously detected, a procedure may repeat the flowchart 200 of FIG. 2 after returning to operation 202 of obtaining the size of the display region after the specific time. When the change in the size of the display region is not continuously detected. The electronic device may terminate a screen update process according to the size change of the display region.

The electronic device may not form a frame, to which the size of the display region at a time when a change in the size of the display region is detected is reflected, but may form a frame by predicting the size of the display region after a delay time has elapsed from the time when the change in the size of the display region is detected. Accordingly, the electronic device may reduce a difference between the size of the display region and a frame to be updated, at an actual screen update time.

In addition, delay times may be different from one another for each electronic device, but a delay time within a single electronic device may be uniform or almost uniform. Accordingly, the accuracy of prediction of the size of the display region of the electronic device may be further increased.

Moreover, a change speed of the size of the display region in the electronic device having a semi-automatic or fully-automatic flexible display is uniform or almost uniform, and thus the accuracy of prediction of the size of the display region of the electronic device may be further increased.

Furthermore, it is possible to predict the size of the display region after a specific time even when the size of the display region in the electronic device having a fully-automatic flexible display is changed at a uniform speed and then a change in the size is stopped. Accordingly, a frame having a size corresponding to the size of an actual display region may be displayed on a screen.

The electronic device may compare the size of the display region at the corresponding time with the size of a frame to be updated, at a point in time when a frame corresponding to the signal for changing the size of the display region is completely formed, thereby minimizing a difference between the size of the display region and the size of the frame to be updated at the actual screen update time.

Hereinafter, an effect of an electronic device according to an embodiment is described below with reference to FIG. 5.

Figure 5:
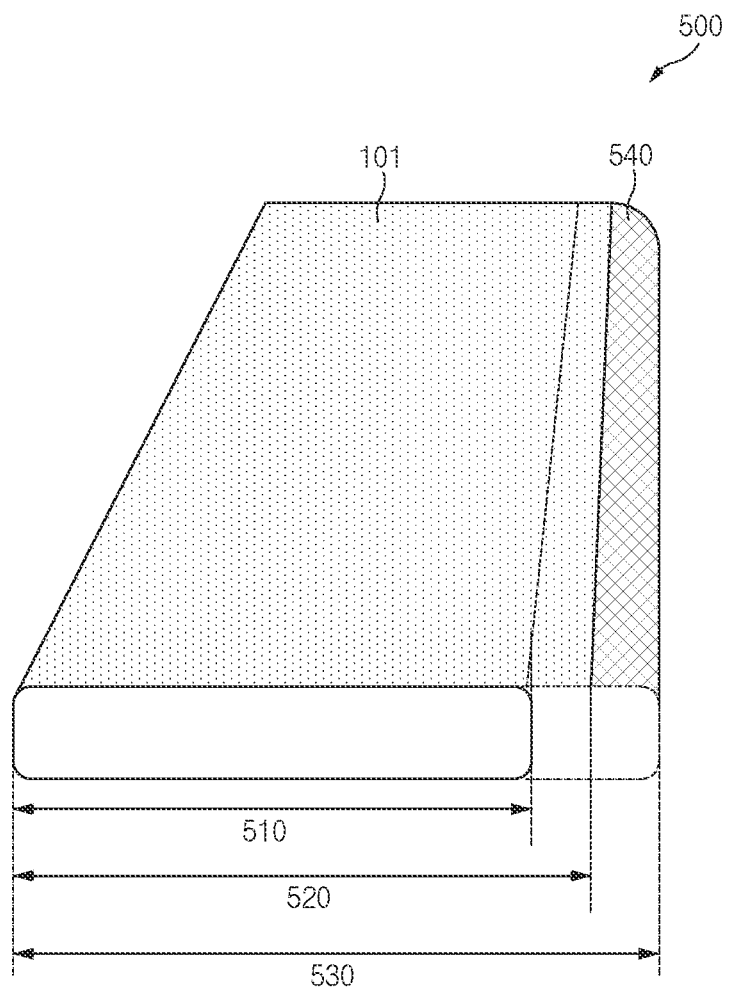
FIG. 5 is a diagram for describing an effect of an electronic device, according to an embodiment of the disclosure.

FIG. 5 is a diagram 500 showing an effect of an electronic device, according to an embodiment of the disclosure.

Referring to FIG. 5, a display screen of the electronic device 101 may have a first size 510 at a current time t0. The electronic device 101 may detect a change in a size of a display region at the current time t0. At the current time t0, the electronic device 101 may detect that the display screen has changed to a second size 520.

The electronic device 101 may form a frame corresponding to the second size 520 upon detecting the change in the size of the display region. However, the delay time td may elapse from the current time t0 until a frame is actually formed and displayed on the display screen, and the display region of a screen of the electronic device 101 continues to increase while the delay time td elapses. Accordingly, the size of the display region of the electronic device 101 may be a third size 530 after the delay time td has elapsed. As a result, when a frame formed in response to the second size 520 is displayed on the display screen, a difference may occur between the size of the formed frame and the third size 530 that is the size of the actual display region. At this time, the screen may be in a black state or off state where the frame is not displayed as much as a size 540 of the display region where the difference occurs.

On the other hand, upon detecting a change in the size of the display region, the electronic device 101 according to an embodiment described above with reference to FIGS. 2, 3 and 4 may predict the size of the display region at the time 't0+td' when a frame output is expected. The electronic device 101 may form a frame corresponding to the predicted size of the display region, and thus may reduce the difference between the size of the formed frame and the third size 530 that is the size of the actual display region, at a point in time when a frame is actually displayed. As a result, a frame corresponding to the size of the display region may be displayed without a screen in an off state.

Figure 6:
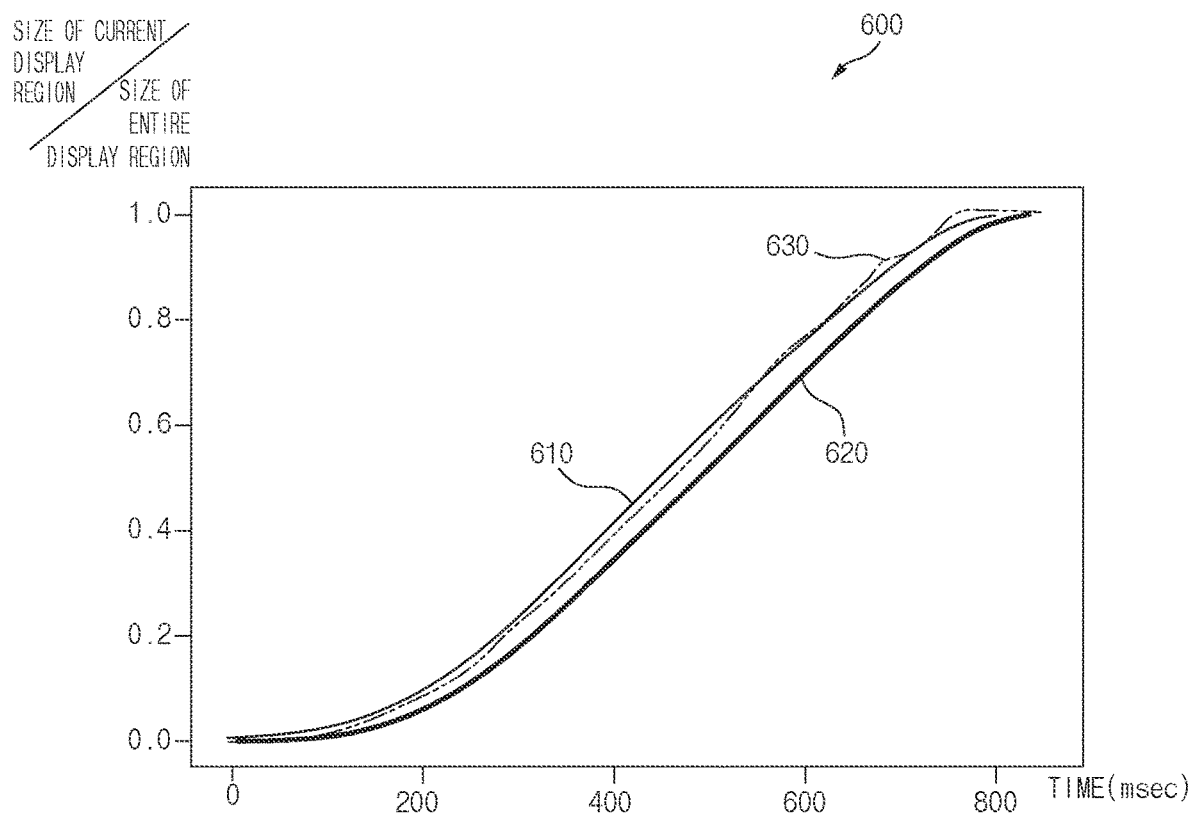
FIG. 6 is a graph for describing an effect of an electronic device, according to an embodiment of the disclosure.

As described above with reference to FIGS. 2, 3 and 4, the electronic device 101 may determine a frame having a size similar to the size of the display region at the corresponding time, from among a frame displayed at the corresponding time and a frame corresponding to the third size 530 at a point in time when a frame corresponding to the predicted third size 530 is completely formed, thereby reducing the difference between the size of the display region and the size of the frame to be updated at an actual screen update time Hereinafter, an effect of an electronic device according to an embodiment is described below with reference to FIG. 6.

FIG. 6 is a graph 600 for describing an effect of an electronic device, according to an embodiment of the disclosure.

Referring to FIG. 6, an x-axis of graph 600 of FIG. 6 may indicate time (msec); a y-axis of graph 600 of FIG. 6 may indicate a ratio of a size of a current display region to a size of the entire display region. Hereinafter, in FIGS. 6, 7, 8, 9, and 10, the ratio of the size of the current display region to the size of the entire display region, which is indicated by the y-axis, may be based on only the changeable display region of the display of an electronic device. The size of the entire display region may refer to a changeable display region that is expanded to the maximum size, based on only the changeable display region other than the display region incapable of being changed in the display, and the size of the current display region may refer to the current size of the changeable display region. A first graph line 610 may indicate the size of the display region of a display of the electronic device changed over time. In the graph 600 of FIG. 6, an electronic device includes a semi-automatic flexible display. The graph 600 of FIG. 6 may be a result of simulating a case that a screen is expanded at a slow speed when screen expansion is started by a user's external force, and then the screen is expanded at a high speed by using the elasticity of an elastic member (e.g., a spring) in the electronic device.

A second graph line 620 may indicate the size of a screen updated upon detecting the size of the changed screen. In a case of applying the embodiment described above with reference to FIGS. 2, 3, and 4, a third graph line 630 may indicate the size of the updated screen that is predicted upon detecting the size of the changed screen.

As shown in the graph 600 of FIG. 6, the third graph line 630 corresponding to the case of applying the embodiment described above with reference to FIGS. 2, 3, and 4 has less difference from the first graph line 610 indicating the actual size of the display region of the display than a difference from the second graph line 620. When applying the embodiment described above with reference to FIGS. 2, 3, and 4, the difference may be reduced between the size of the display region and the size of a frame being displayed, at the actual screen update time.

Hereinafter, the reduction of a display region of a display of an electronic device is described below with reference to FIG. 7.

Figure 7:
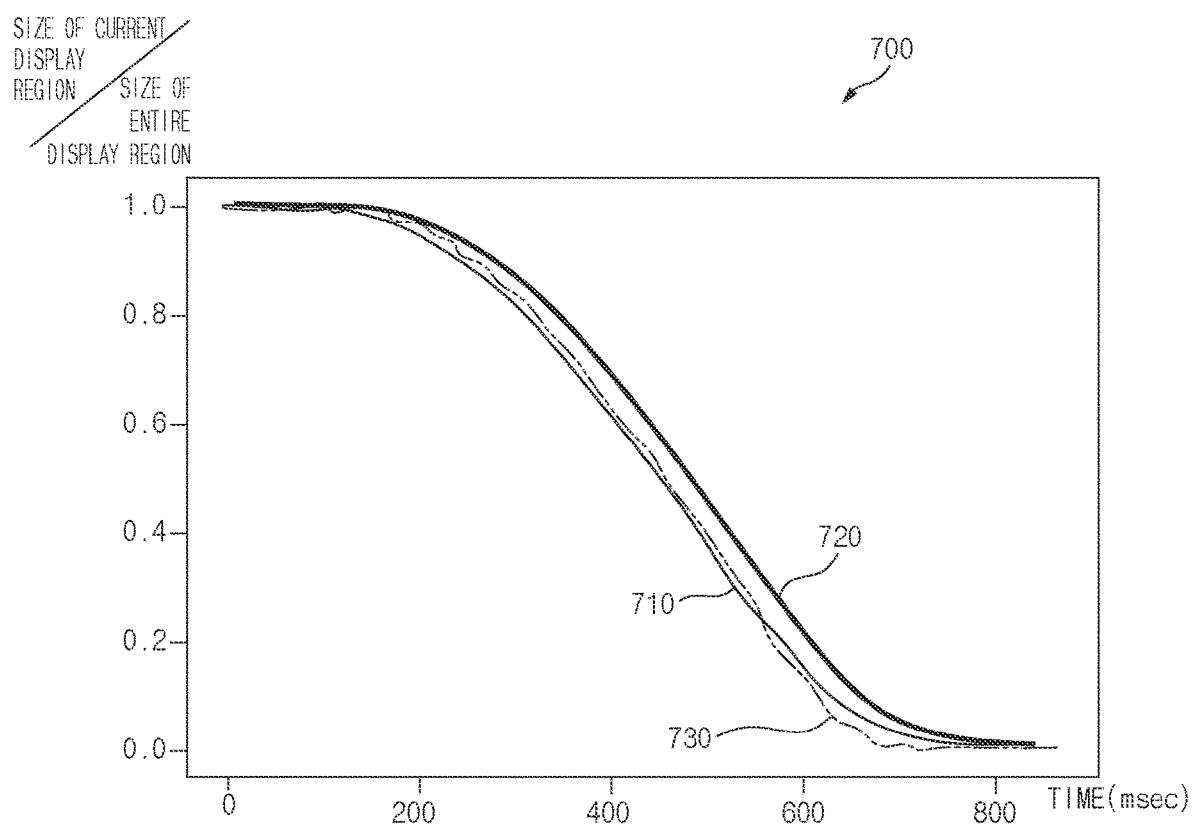
FIG. 7 is a graph for describing an effect of an electronic device, according to an embodiment of the disclosure.

FIG. 7 is a graph 700 describing an effect of an electronic device, according to an embodiment of the disclosure.

Referring to FIG. 7, an x-axis of the graph 700 may indicate time (msec); a y-axis of the graph 700 may indicate a ratio of a size of a current display region to a size of the entire display region. A first graph line 710 may indicate the size of the display region of a display of the electronic device changed over time. In the graph 700 it is assumed that an electronic device includes a semi-automatic flexible display. The graph 700 may be a result of simulating a case that a screen is reduced at a slow speed when screen reduction is started by a user's external force, and then the screen is reduced at a high speed by using the elasticity of an elastic member (e.g., a spring) in the electronic device.

A second graph line 720 may indicate the size of a screen updated upon detecting the size of the changed screen. In a case of applying the embodiment described above with reference to FIGS. 2, 3, and 4, a third graph line 730 may indicate the size of the updated screen that is predicted upon detecting the size of the changed screen.

Likewise, it may be seen that the third graph line 730 corresponding to the case of applying the embodiment described above with reference to FIGS. 2, 3, and 4 has a smaller difference from the first graph line 710 indicating the actual size of the display region of the display than a difference from the second graph line 720. In the case of applying the embodiment described above with reference to FIGS. 2, 3, and 4, the difference may be reduced between the size of the display region and the size of a frame being displayed, at the actual screen update time.

Hereinafter, the expansion a display region of a display of an electronic device is described below with reference to FIG. 8.

Figure 8:
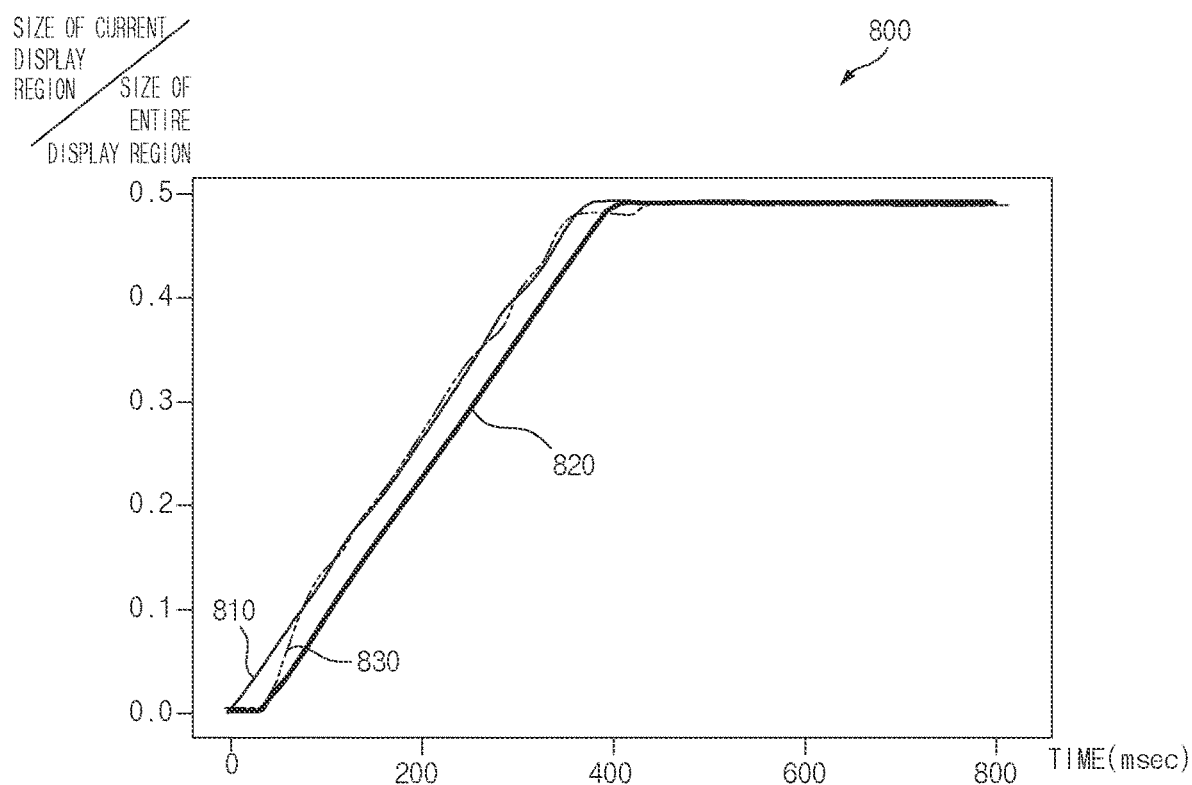
FIG. 8 is a graph for describing an effect of an electronic device, according to an embodiment of the disclosure.

FIG. 8 is a graph 800 describing an effect of an electronic device, according to an embodiment of the disclosure.

Referring to FIG. 8, an x-axis of the graph 800 may indicate time (msec); a y-axis of the graph may indicate a ratio of a size of a current display region to a size of the entire display region. A first graph line 810 may indicate the size of the display region of a display of an electronic device changed over time. in the graph 800, it is assumed that an electronic device includes a fully-automatic flexible display using a motor or the like. The graph 800 may be a result of simulating a case that the size of the display region is expanded at a specific speed, and then the expansion is stopped before the screen is expanded to the maximum size.

A second graph line 820 may indicate the size of a screen updated upon detecting the size of the changed screen. In a case of applying the embodiment described above with reference to FIGS. 2, 3, and 4, a third graph line 830 may indicate the size of the updated screen that is predicted upon detecting the size of the changed screen.

Referring to the graph 800, it may be seen that the third graph line 830 corresponding to the case of applying the embodiment described above with reference to FIGS. 2, 3, and 4 has a smaller difference from the first graph line 810 indicating the actual size of the display region of the display than a difference from the second graph line 820. In the case of applying the embodiment described above with reference to FIGS. 2, 3, and 4, an event that the size expansion of the display region is stopped may be quickly reflected to a frame size, thereby reducing a difference between the size of the display region and the size of a frame being displayed, at the actual screen update time.

Hereinafter, the expansion of a display region of a display of an electronic device is described below with reference to FIG. 9.

Figure 9:
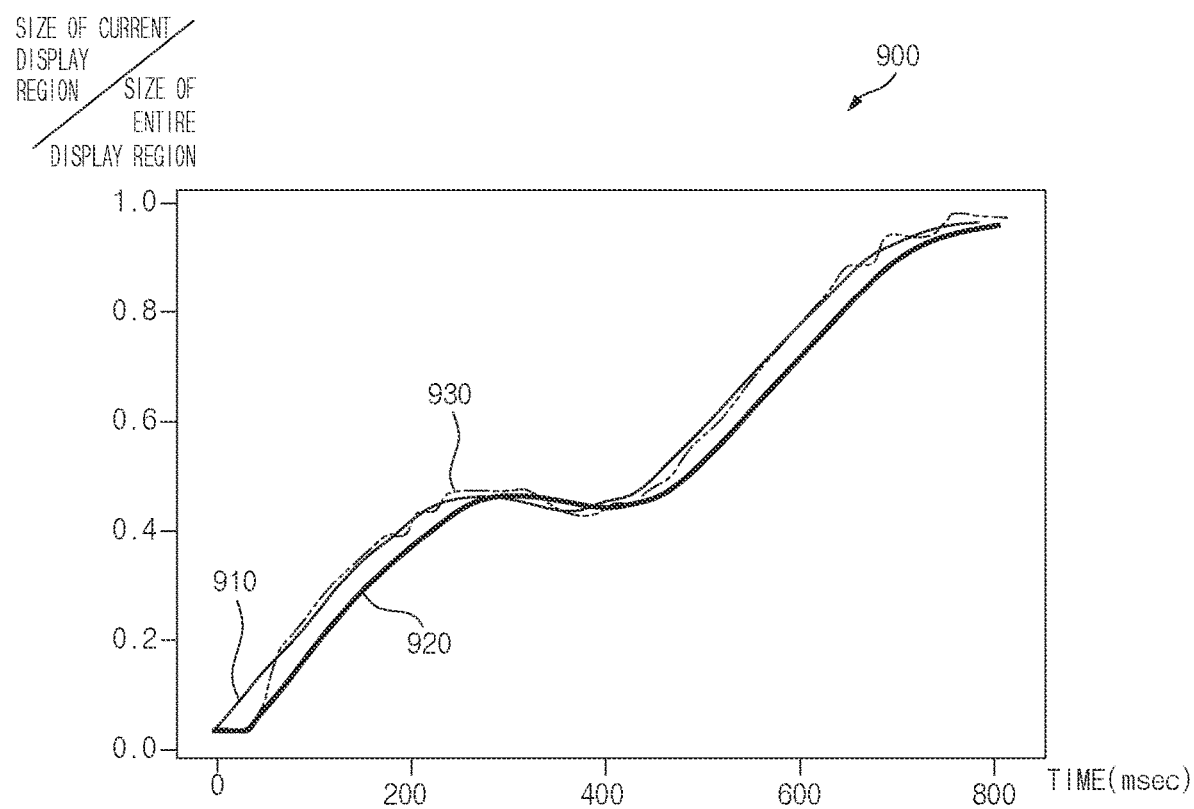
FIG. 9 is a graph for describing an effect of an electronic device, according to an embodiment of the disclosure.

FIG. 9 is a graph 900 describing an effect of an electronic device, according to an embodiment of the disclosure.

Referring to FIG. 9, an x-axis of the graph 900 may indicate time (msec), and a y-axis of the graph 900 may indicate a ratio of a size of a current display region to a size of the entire display region. A first graph line 910 may indicate the size of the display region of a display of an electronic device changed over time. The graph 900 may be a result of simulating a case that a size of a display region of the electronic device is expanded, the size change of the display region is stopped during the specific time, and then the size of the display region is expanded again.

A second graph line 920 may indicate the size of a screen updated upon detecting the size of the changed screen. In a case of applying the embodiment described above with reference to FIGS. 2, 3, and 4, a third graph line 930 may indicate the size of the updated screen that is predicted upon detecting the size of the changed screen.

Referring to the graph 900, it may be seen that the third graph line 930 corresponding to the case of applying the embodiment described above with reference to FIGS. 2, 3, and 4 has a smaller difference from the first graph line 910 indicating the actual size of the display region of the display than a difference from the second graph line 920. In the case of applying the embodiment described above with reference to FIGS. 2, 3, and 4, the difference may be reduced between the size of the display region and the size of a frame being displayed, at the actual screen update time.

Hereinafter, a case in which the size of the display region of the display of the electronic device is expanded, reduced, and then again expanded, is described below with reference to FIG. 10.

Figure 10:
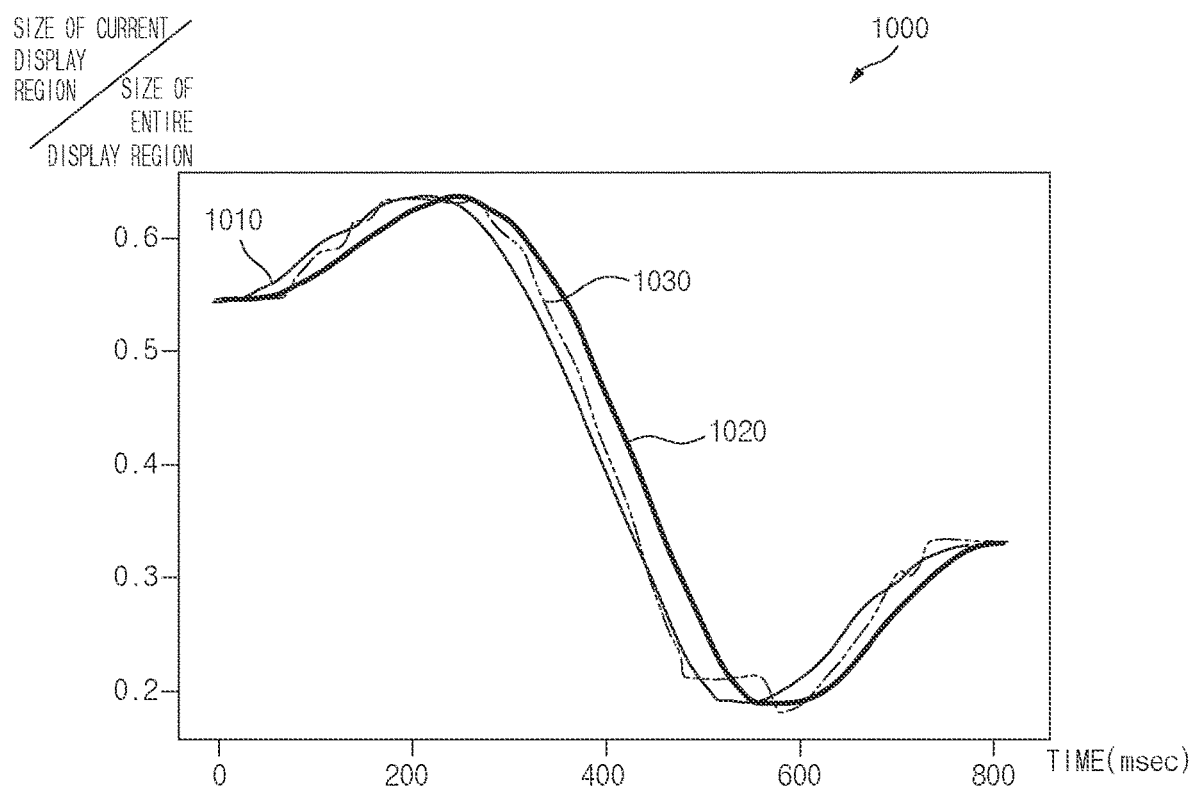
FIG. 10 is a graph for describing an effect of an electronic device, according to an embodiment of the disclosure.

FIG. 10 is a graph 1000 describing an effect of an electronic device, according to an embodiment of the disclosure.

Referring to FIG. 10, an x-axis of the graph 1000 may indicate time (msec), and a y-axis of the graph 1000 may indicate a ratio of a size of a current display region to a size of the entire display region. A first graph line 1010 may indicate the size of the display region of a display of the electronic device changed over time. The graph 1000 of FIG. 10 may be a result of simulating a case that the size of the display region of the display of the electronic device is expanded, reduced, and then again expanded.

A second graph line 1020 may indicate the size of a screen updated upon detecting the size of the changed screen. In a case of applying the embodiment described above with reference to FIGS. 2, 3, and 4, a third graph line 1030 may indicate the size of the updated screen that is predicted upon detecting the size of the changed screen.

Referring to the graph 1000, it may be seen that the third graph line 1030 corresponding to the case of applying the embodiment described above with reference to FIGS. 2, 3, and 4 has a smaller difference from the first graph line 1010 indicating the actual size of the display region of the display than a difference from the second graph line 1020. In the case of applying the embodiment described above with reference to FIGS. 2, 3, and 4, the difference may be reduced between the size of the display region and the size of a frame being displayed, at the actual screen update time.

Figure 11:
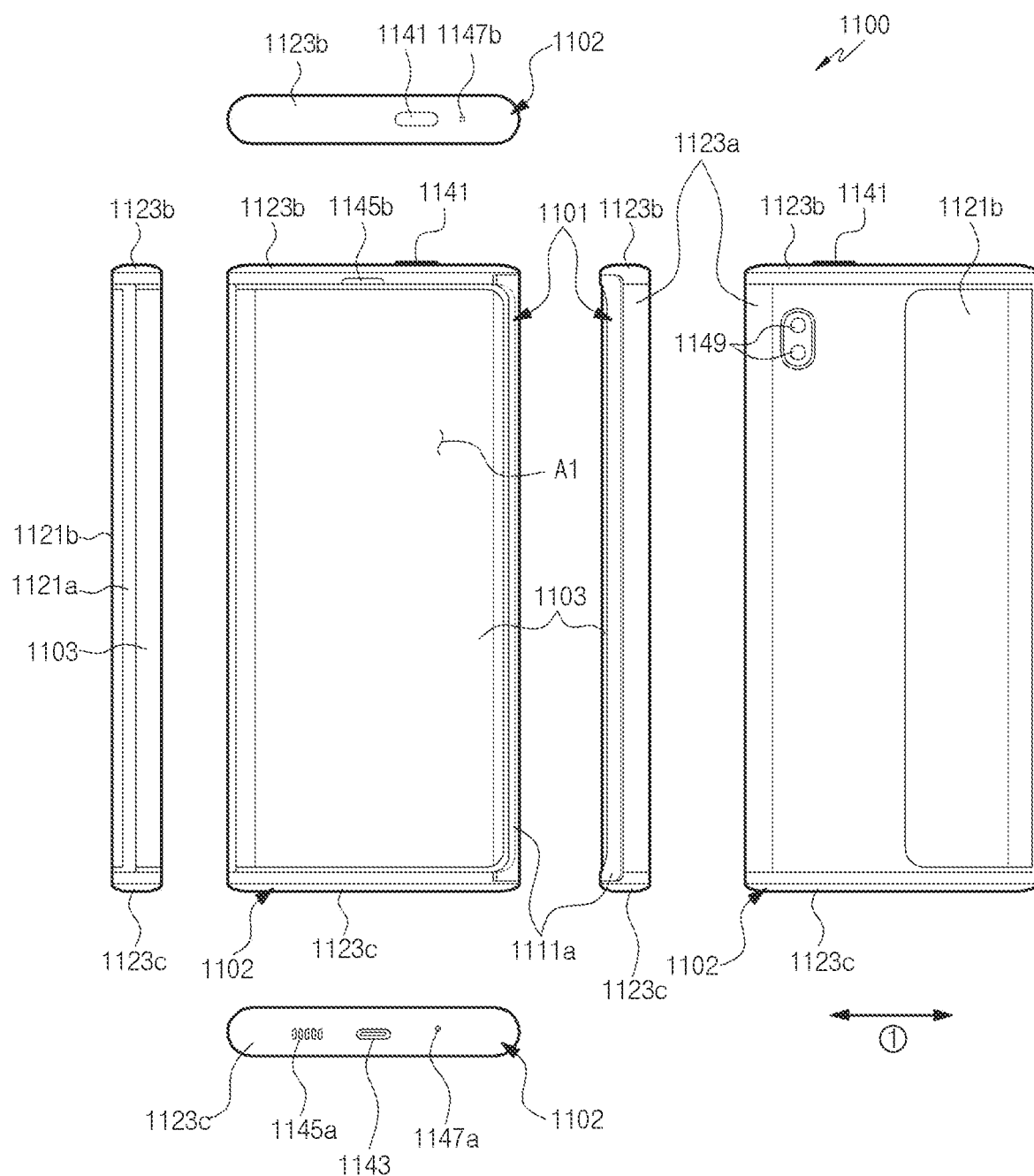
FIG. 11 is a diagram of an electronic device, according to an embodiment of the disclosure.

FIG. 11 is a diagram of an electronic device, according to an embodiment of the disclosure. FIG. 11 is a diagram illustrating a state where a part of a flexible display is accommodated in a second structure.

Figure 12:
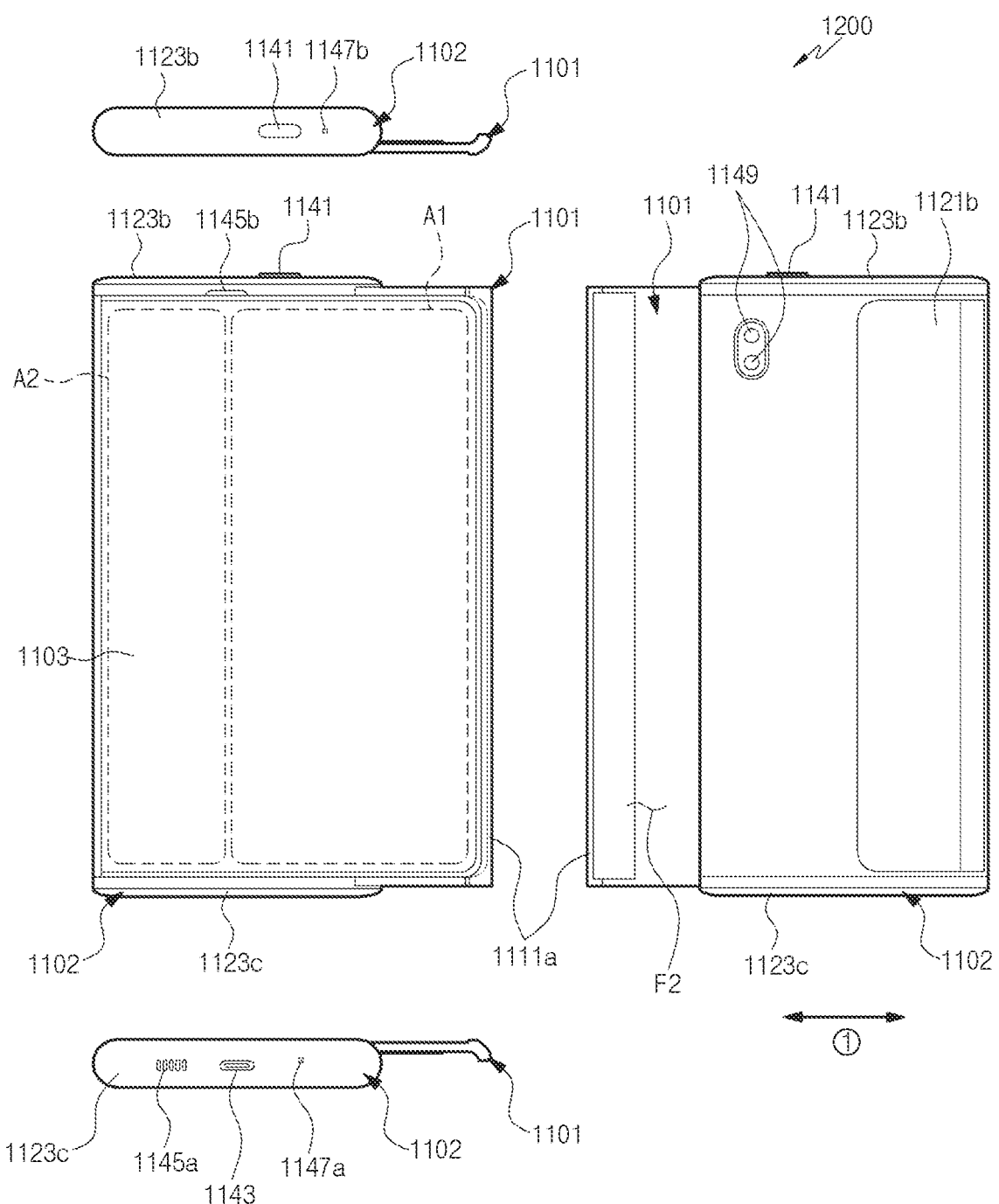
FIG. 12 is a diagram of an electronic device, according to an embodiment of the disclosure.

FIG. 12 is a diagram of an electronic device, according to an embodiment of the disclosure. FIG. 12 is a diagram illustrating a state where most of a flexible display is exposed to the outside of a second structure.

A state illustrated in FIG. 11 may be defined as a first structure 1101 being closed with respect to a second structure 1102. A state illustrated in FIG. 12 may be defined as the first structure 1101 being opened with respect to the second structure 1102. A "closed state" or an "opened state" may be defined as a closed or opened state of an electronic device.

Referring to FIGS. 11 and 12, an electronic device 1100 may include the first structure 1101 and the second structure 1102. The first structure 1101 may be disposed to be movable within the second structure 1102. The first structure 1101 may be interpreted as a structure arranged to be slidable on the second structure 1102. The first structure 1101 may be arranged to perform a reciprocating motion by a specific distance in a direction (e.g., a direction indicated by arrow ①) shown based on the second structure 1102.

The first structure 1101 may be referred to as, for example, first housing, a slide portion, or slide housing. The first structure 1101 may be disposed to perform a reciprocating motion on the second structure 1102. The second structure 1102 may be referred to as, for example, second housing, a main part, or main housing. The second structure 1102 may accommodate various electric parts and various electronic parts such as a main circuit board and a battery. A portion (e.g., a first region A1) of a display 1103 may be seated on the first structure 1101. As the first structure 1101 is moved (e.g., slide movement) with respect to the second structure 1102, another part (e.g., a second region A2) of the display 1103 may be accommodated (e.g., a slide-in operation) inside the second structure 1102 or exposed (e.g., a slide-out operation) to the outside of the second structure 1102.

The first structure 1101 may include a first plate 1111a (e.g., a slide plate). The first structure 1101 may include a first structure surface F1 formed to include at least part of the first plate 1111a and a second structure surface F2 facing in a direction opposite to the first structure surface F1. According to an embodiment, the second structure 1102 may include a second plate (e.g., a second plate 1121a of FIG. 11) (e.g., a rear case)), a first side wall 1123a extending from the second plate 1121a, a second side wall 1123b extending from the first side wall 1123a and the second plate 1121a, a third side wall 1123c extending from the first side wall 1123a and the second plate 1121a and parallel to the second side wall 1123b, and/or a back plate 1121b (e.g., a rear window). The second side wall 1123b and the third side wall 1123c may be formed perpendicular to the first side wall 1123a. The second plate 1121a, the first side wall 1123a, the second side wall 1123b, and the third side wall 1123c may be formed such that one side (e.g., a front surface) is opened to accommodate (or surround) at least part of the first structure 1101. For example, the first structure 1101 may be coupled to the second structure 1102 in a state where the first structure 1101 at least partially surrounds the second structure 1102. While being guided by the second structure 1102, the first structure 1101 may slide in a direction (e.g., a direction of arrow ①) parallel to the first surface F1 or the second surface F2.

The second side wall 1123b or the third side wall 1123c may be omitted. The second plate 1121a, the first side wall 1123a, the second side wall 1123b, and/or the third side wall 1123c may be formed as separate structures so as to be coupled or assembled to one another. The back plate 1121b may be coupled to surround at least part of the second plate 1121a. The back plate 1121b may be substantially integrated with the second plate 1121a. The second plate 1121a or the back plate 1121b may cover at least part of the flexible display 1103. For example, the flexible display 1103 may be at least partially accommodated inside the second structure 1102. The second plate 1121a or the back plate 1121b may cover a part of the flexible display 1103 accommodated inside the second structure 1102.

The first structure 1101 may be moved to be in the opened state and the closed state with respect to the second structure 1102 in a direction (e.g., direction ①) parallel to the second plate 1121a (e.g., a rear case) and the second side wall 1123b. In the closed state, the first structure 1101 may be positioned within a first distance from the first side wall 1123a. In the opened state, the first structure 1101 may be positioned within a second distance greater than the first distance from the first side wall 1123a. In the closed state, the first structure 1101 may be positioned to surround a part of the first side wall 1123a.

According to various embodiments, the electronic device 1100 may include at least one of the display 1103, a key input device 1141, a connector hole 1143, audio modules 1145a, 1145b, 1147a, and 1147b, or a camera module 1149. Although not illustrated in FIG. 11 or 12, the electronic device 1100 may further include an indicator (e.g., an LED device) or various sensor modules.

The display 1103 may include the first region A1 and the second region A2. The first region A1 may extend substantially across at least part of the first structure surface F1 to be disposed on the first structure surface F1. The second region A2 may extend from the first region A1 and may be inserted or accommodated into the second structure 1102 (e.g., housing) depending on the slide movement of the first structure 1101, or may be exposed to the outside of the second structure 1102. As will be described below, the second region A2 may be moved while being guided by a roller (e.g., a roller 1151 of FIG. 6) mounted on the second structure 1102 and then may be accommodated inside the second structure 1102 or may be exposed to the outside of the second structure 1102. For example, while the first structure 1101 slides in or out, a part of the second region A2 may be deformed into a curved shape at a location corresponding to the roller 1151.

When viewed from above the first plate 1111a (e.g., a slide plate), when the first structure 1101 is moved from the closed state to the opened state, a plane may be substantially formed together with the first region A1 while the second region A2 is gradually exposed to the outside of the second structure 1102. The display 1103 may be coupled to a touch sensing circuit, a pressure sensor capable of measuring the intensity (or pressure) of a touch, and/or a digitizer detecting a magnetic stylus pen or may be disposed adjacent thereto. In an embodiment, the second region A2 may be at least partially accommodated inside the second structure 1102. Even in the state (e.g., a closed state) shown in FIG. 11, a part of the second region A2 may be exposed to the outside. In an embodiment, regardless of the closed or opened state, a part of the exposed second region A2 may be positioned on the roller 1151, and a part of the second region A2 may maintain a curved shape at a position corresponding to the roller 1151.

The key input device 1141 may be disposed on the second side wall 1123b or the third side wall 1123c of the second structure 1102. Depending on appearances and usage conditions, the illustrated key input device 1141 may be omitted, or the electronic device 1100 may be designed to include additional key input device(s). The electronic device 1100 may include a key input device (not shown), for example, a home key button or a touch pad disposed at a periphery of the home key button. At least part of the key input device 1141 may be positioned in a region of the first structure 1101.

The connector hole 1143 may be omitted, and may accommodate a connector (e.g., a USB connector) for transmitting and receiving power and/or data with an external electronic device. Although not illustrated in FIG. 11 or 12, the electronic device 1100 may include a plurality of connector holes 1143. Some of the plurality of connector holes 1143 may function as a connector hole for transmitting or receiving an audio a signal with the external electronic device. In the embodiment illustrated in FIGS. 11 and 12, the connector hole 1143 is disposed on the third side wall 1123c, but the disclosure is not limited thereto. For example, the connector hole 1143 or a connector hole not shown may be disposed on the first side wall 1123a or the second side wall 1123b.

The audio modules 1145a, 1145b, 1147a, and 1147b may include the speaker holes 1145a and 1145b, or the microphone holes 1147a and 1147b. One of the speaker holes 1145a and 1145b may be provided as a receiver hole for making a voice call, and the other may be provided as an external speaker hole. The microphone holes 1147a and 1147b may include a microphone for obtaining external sound therein. In an embodiment, the microphone holes 1147a and 1147b may include a plurality of microphones to detect the direction of sound. In any embodiment, the speaker holes 1145*a* and 1145*b* and the microphone holes 1147*a* and 1147*b* may be implemented with one hole, or a speaker (e.g., a piezo speaker) may be included without the speaker holes 1145*a* and 1145*b*. A speaker hole 1145*b* is disposed on the first structure 1101 and may be used as a receiver hole for making a voice call. A speaker hole (e.g., an external speaker hole) 1145*a* or the microphone holes 1147*a* and 1147*b* may be disposed on the second structure 1102 (e.g., one of the side walls 1123*a*, 1123*b*, and 1123*c*).

The camera module 1149 may be provided in the second structure 1102 and may capture a subject in a direction opposite to the first region A1 of the display 1103. The electronic device 1100 may include a plurality of camera modules 1149. For example, the electronic device 1100 may include a wide-angle camera, a telephoto camera, or a close-up camera. The electronic device 1100 may measure a distance to the subject by including an infrared projector and/or an infrared receiver. The camera module 1149 may include one or more lenses, an image sensor, and/or an image signal processor. Although not illustrated in FIG. 11 or 12, the electronic device 1100 may further include a camera module (e.g., a front camera) for capturing the subject in a direction identical to a direction of the first region A1 of the display 1103. For example, the front camera may be disposed around the first region A1 or in a region where the front camera overlaps the display 1103. When the front camera is positioned in the region where the front camera overlaps the display 1103, the front camera may capture the subject by penetrating the display 1103.

An indicator (not shown) of the electronic device 1100 may be disposed on the first structure 1101 or the second structure 1102. The indicator of the electronic device 1100 may provide status information of the electronic device 1100 as a visual signal by including a light emitting diode. A sensor module (not shown) of the electronic device 1100 may generate an electrical signal or a data value corresponding to an internal operating state of the electronic device 1100 or an external environment state. For example, the sensor module may include a proximity sensor, a fingerprint sensor, or a biometric sensor (e.g., an iris/face recognition sensor or an HRM sensor). The sensor module may further include at least one of, for example, a gesture sensor, a gyro sensor, a barometric pressure sensor, a magnetic sensor, an acceleration sensor, a grip sensor, a color sensor, an infrared (IR) sensor, a temperature sensor, a humidity sensor, or the illumination sensor.

According to an embodiment of the disclosure, an electronic device may include a flexible display and a processor operatively connected to the flexible display. The processor may be configured to estimate a size of a display region after a delay time elapses upon detecting that the size of the display region is changed, at a first time, to form a second frame at the estimated size of the display region, to identify the size of the display region at a second time when the second frame is completely formed, to obtain a first difference value that is a difference value between a size of the second frame and the size of the display region at the second time, to obtain a second difference value that is a difference value between a size of a first frame output to the display region at the second time and the size of the display region at the second time, to output the second frame in the display region of the flexible display when the first difference value is less than the second difference value, and to maintain an output of the first frame in the display region when the first difference value is not less than the second difference value.

According to an embodiment of the disclosure, the delay time may correspond to a time required from a point in time when the electronic device detects a signal for changing the size of the display region until a frame corresponding to the signal is reflected to the display region.

According to an embodiment of the disclosure, the processor may be configured to estimate the size of the display region after the delay time elapses, based on an average speed of a change in the size of the display region during a past specific time.

According to an embodiment of the disclosure, the processor may be configured to output the second frame in the display region of the flexible display at a screen update time after the second time when the first difference value is less than the second difference value.

According to an embodiment of the disclosure, the processor may be configured not to update the display region at a screen update time after the second time when the first difference value is not less than the second difference value.

According to an embodiment of the disclosure, the processor may be configured to correct the estimated size of the display region to the maximum size when the estimated size of the display region is greater than a maximum size of the display region.

According to an embodiment of the disclosure, the processor may be configured to correct the estimated size of the display region to the minimum size when the estimated size of the display region is less than a minimum size of the display region.

According to an embodiment of the disclosure, the first frame may be a frame that is updated at a display region update time before the second time and then is output to the display region.

According to an embodiment of the disclosure, the size of the display region may be changed manually, semi-automatically, or automatically.

According to an embodiment of the disclosure, the processor may be configured to detect a signal for changing the size of the display region at a specific period.

In accordance with another aspect of the disclosure, a display region updating method of an electronic device including a flexible display may include estimating a size of a display region after a delay time elapses upon detecting that the size of the display region is changed, at a first time, forming a second frame at the estimated size of the display region, identifying the size of the display region at a second time when the second frame is completely formed, obtaining a first difference value that is a difference value between a size of the second frame and the size of the display region at the second time, obtaining a second difference value that is a difference value between a size of a first frame output to the display region at the second time and the size of the display region at the second time, outputting the second frame in the display region of the flexible display when the first difference value is less than the second difference value, and maintaining an output of the first frame in the display region when the first difference value is not less than the second difference value.

According to an embodiment of the disclosure, the delay time may correspond to a time required from a point in time when the electronic device detects a signal for changing the size of the display region until a frame corresponding to the signal is reflected to the display region.

According to an embodiment of the disclosure, the method may further include estimating the size of the display region after the delay time elapses, based on an average speed of a change in the size of the display region during a past specific time.

According to an embodiment of the disclosure, the method may further include outputting the second frame in the display region of the flexible display at a screen update time after the second time when the first difference value is less than the second difference value.

According to an embodiment of the disclosure, the method may further include not updating the display region at a screen update time after the second time when the first difference value is not less than the second difference value.

According to an embodiment of the disclosure, the method may further include correcting the estimated size of the display region to the maximum size when the estimated size of the display region is greater than a maximum size of the display region.

According to an embodiment of the disclosure, the method may further include correcting the estimated size of the display region to the minimum size when the estimated size of the display region is less than a minimum size of the display region.

According to an embodiment of the disclosure, the first frame may be a frame that is updated at a display region update time before the second time and then is output to the display region.

According to an embodiment of the disclosure, the size of the display region may be changed manually, semi-automatically, or automatically.

According to an embodiment of the disclosure, the method may further include detecting a signal for changing the size of the display region at a specific period.

In accordance with an electronic device according to an embodiment of the disclosure, it is possible to provide an electronic device including a flexible display that is capable of reducing a difference between a changed size of a display region and a size of an output image frame, and an operating method thereof.

In addition, a variety of effects directly or indirectly understood through the specification may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a flexible display; and
a processor operatively connected to the flexible display, wherein the processor is configured to:
  estimate a size of a display region after a delay time elapses upon detecting that the size of the display region is changed, at a first time;
  form a second frame at the estimated size of the display region;
  identify the size of the display region at a second time when the second frame is completely formed;
  obtain a first difference value that is a difference between a size of the second frame and the size of the display region at the second time;
  obtain a second difference value that is a difference between a size of a first frame output to the display region at the second time and the size of the display region at the second time;
  when the first difference value is less than the second difference value, output the second frame in the display region; and
  when the first difference value is not less than the second difference value, maintain an output of the first frame in the display region.

2. The electronic device of claim 1, wherein a delay time corresponds to a time required from a point in time when the electronic device detects a signal for changing the size of the display region until a frame corresponding to the signal is reflected to the display region.

3. The electronic device of claim 2, wherein the processor is further configured to:
  estimate the size of the display region after the delay time elapses, based on an average speed of a change in the size of the display region during a past specific time.

4. The electronic device of claim 1, wherein the processor is further configured to:
  when the first difference value is less than the second difference value, output the second frame in the display region of the flexible display at a screen update time after the second time.

5. The electronic device of claim 1, wherein the processor is further configured to:
  when the first difference value is not less than the second difference value, not update the display region at a screen update time after the second time.

6. The electronic device of claim 1, wherein the processor is further configured to:
  when the estimated size of the display region is greater than a maximum size of the display region, adjust the estimated size of the display region to the maximum size.

7. The electronic device of claim 1, wherein the processor is further configured to:
  when the estimated size of the display region is less than a minimum size of the display region, correct the estimated size of the display region to the minimum size.

8. The electronic device of claim 1, wherein the first frame is a frame that is updated at a display region update time before the second time and then is output to the display region.

9. The electronic device of claim 1, wherein the size of the display region is changed manually, semi-automatically, or automatically.

10. The electronic device of claim 1, wherein the processor is further configured to:
  detect a signal for changing the size of the display region at a specific period.

11. A display region updating method of an electronic device including a flexible display, the method comprising:
  estimating a size of a display region after a delay time elapses upon detecting that the size of the display region is changed, at a first time;
  forming a second frame at the estimated size of the display region;
  identifying the size of the display region at a second time when the second frame is completely formed;
  obtaining a first difference value that is a difference between a size of the second frame and the size of the display region at the second time;
  obtaining a second difference value that is a difference between a size of a first frame output to the display region at the second time and the size of the display region at the second time;
  when the first difference value is less than the second difference value, outputting the second frame in the display region of the flexible display; and
  when the first difference value is not less than the second difference value, maintaining an output of the first frame in the display region.

12. The method of claim 11, wherein the delay time corresponds to a time required from a point in time when the electronic device detects a signal for changing the size of the display region until a frame corresponding to the signal is reflected to the display region.

13. The method of claim 11, further comprising:
estimating the size of the display region after the delay time elapses, based on an average speed of a change in the size of the display region during a past specific time.

14. The method of claim 11, further comprising:
when the first difference value is less than the second difference value, outputting the second frame in the display region of the flexible display at a screen update time after the second time.

15. The method of claim 11, further comprising:
when the first difference value is not less than the second difference value, not updating the display region at a screen update time after the second time.

16. The method of claim 11, further comprising:
when the estimated size of the display region is greater than a maximum size of the display region, adjusting the estimated size of the display region to the maximum size.

17. The method of claim 11, further comprising:
when the estimated size of the display region is less than a minimum size of the display region, correcting the estimated size of the display region to the minimum size.

18. The method of claim 11, wherein the first frame is a frame that is updated at a display region update time before the second time and then is output to the display region.

19. The method of claim 11, wherein the size of the display region is changed manually, semi-automatically, or automatically.

20. The method of claim 11, further comprising:
detecting a signal for changing the size of the display region at a specific period.

* * * * *